(12) United States Patent
Li et al.

(10) Patent No.: US 6,822,046 B2
(45) Date of Patent: Nov. 23, 2004

(54) MONOVINYLAROMATIC POLYMER WITH IMPROVED STRESS CRACK RESISTANCE

(75) Inventors: Jianbo Li, Houston, TX (US); Jose M. Sosa, Deer Park, TX (US); Aron Griffith, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 72 days.

(21) Appl. No.: 10/052,149

(22) Filed: Jan. 17, 2002

(65) Prior Publication Data

US 2002/0099144 A1 Jul. 25, 2002

Related U.S. Application Data

(63) Continuation of application No. 09/546,891, filed on Apr. 10, 2000, now abandoned.

(51) Int. Cl.$^7$ .............................................. C08L 51/00
(52) U.S. Cl. ......................... 525/86; 525/256; 525/263
(58) Field of Search ........................... 525/86, 256, 263

(56) References Cited

U.S. PATENT DOCUMENTS

| | | | |
|---|---|---|---|
| 4,440,885 A | 4/1984 | Tamosauskas | |
| 4,777,210 A | 10/1988 | Sosa | |
| 4,861,827 A | 8/1989 | Sosa et al. | |
| 5,266,603 A | 11/1993 | Holzmeier | |
| 5,543,461 A | 8/1996 | Nke-Aka et al. | |
| 5,760,149 A | 6/1998 | Sanchez | |
| 5,861,455 A | 1/1999 | Reddy et al. | |
| 5,998,552 A | 12/1999 | Gruber et al. | |
| 6,150,479 A | 11/2000 | Klemarczyk et al. | |

FOREIGN PATENT DOCUMENTS

| | | |
|---|---|---|
| EP | 0077632 A | 4/1983 |
| EP | 0458773 A | 11/1991 |
| GB | 691908 A | 5/1953 |
| GB | 767642 A | 2/1957 |
| WO | WO 9807684 | 2/1998 |

OTHER PUBLICATIONS

A. Echte, Rubber Toughened Styrene Polymers, Amer. Chem. Soc. Series #222, 1989 pp. 15–63, Washington, D.C.

C. Corleto, et al., Fracture Behavior of High–Impact Polystyrene Under an Aggressive Enviroment, Polymer Engineering and Science, Mid–January 1996, vol. 36, No. 1, pp. 146–150.

*Primary Examiner*—Jeffrey Mullis
(74) *Attorney, Agent, or Firm*—Madan, Mossman & Sriram, P.C.

(57) ABSTRACT

A process is disclosed for improving the environmental stress crack resistance and other desirable properties of impact-resistant, elastomer-modified monovinylaromatic compounds, said process utilizing a combination of polymerization initiators, including perketals and peroxycarbonates.

11 Claims, No Drawings

MONOVINYLAROMATIC POLYMER WITH IMPROVED STRESS CRACK RESISTANCE

This application is continuation of U.S. patent application No. 09/546,891, filed Apr. 10, 2000, now abandoned and entitled Monovinylaromatic Polymer with Improved Stress Crack Resistance.

FIELD OF THE INVENTION

This present invention relates to thermoplastic compositions utilizing polymers of monovinylaromatic compounds which have been modified with rubber to increase their impact strength and which are particularly useful for manufacturing articles requiring increased environmental stress crack resistance (ESCR). More particularly, the present invention discloses a high impact polystyrene (HIPS) material which is particularly advantageous for use in food product containers which are normally subject to environmental stress cracking.

BACKGROUND OF THE INVENTION

It is well known that rubber-reinforced polymers of monovinylaromatic compounds, such as styrene, alphamethyl styrene and ring-substituted styrenes are desirable for a variety of uses. More particularly, rubber reinforced polymers of styrene having included therein discrete particles of a crosslinked rubber, for example, polybutadiene, the discrete particles of rubber being dispersed throughout the styrene polymer matrix, can be used in a variety of applications including refrigerator linings, packaging applications, furniture, household appliances and toys. The conventional term for such rubber reinforced polymers is "High Impact Polystyrene" or "HIPS". The physical characteristics and mechanical properties of HIPS are dependent upon many factors, including the particle size of the cross-linked rubber particles. One of the most desirable characteristics of HIPS materials is the ability of such materials to resist degradation or destruction by factors such as contact with foods and edible oils. In addition, other properties which must be maintained for such articles include flexural strength and tensile strength.

The property of stress crack resistance, or environmental stress crack resistance (ESCR), is particularly important in thermoplastic copolymers utilized in food containers. The food content of such polymer containers might not normally degrade the type of polymeric material of which the container is made, but when a thermoplastic polymer is thermoformed from extruded sheet material, residual stresses are locked into the molded article. These stresses open the polymer up to attack by substances which it would normally be totally resistant to. Such articles made from styrene polymers modified with rubber to increase impact strength are prone to stress cracking when they come into contact with common agents found in organic food products such as fats and oils. Likewise, such products are also subject to stress cracking when coming into contact with organic blowing agents such as halohydrocarbons containing fluorine and chlorine. These polymers generally are found in household items such as refrigerator liners, which may crack when the cavities in the refrigerators are filled with a polyurethane foam as a result of the blowing agent utilized in the foam.

In the past, environmental stress cracking has been prevented by complex procedures usually involving multiple layer polymer construction wherein an intermediate protective layer of polymer is placed between the polystyrene layer and the blowing agent or the fatty food materials. One such layer of material utilized to insulate the styrene from these agents is the terpolymer material known as ABS, or acrylonitrile-butadiene-styrene. Other attempts to improve the stress crack resistance of high impact monovinylaromatic polymers have been to increase the amount of rubber mixed in the polymer. Unfortunately, the higher rubber content decreases the tensile and flexural strengths of the final material. Other solutions have involved tightly controlling process conditions to maintain strict control over the particle size of the rubber particles cross-linked within the polystyrene matrix. One such patent disclosing this technique is that assigned to the assignee of the present invention, U.S. Pat. No. 4,777,210, issued Oct. 11, 1988, in which a continuous flow process for producing high impact polystyrene and for providing reliable and reproducible methods for varying particle sized was disclosed. In that patented process, a pre-inversion reactor was utilized to convert a solution of styrene, rubber (such as polybutadiene) and a peroxide catalyst into a high impact polystyrene material exhibiting high environmental stress crack resistance.

Another attempt to improve stress crack resistance was that disclosed in U.S. Pat. No. 4,144,204 to Mittnacht, et al., dated Mar. 13, 1979 in which a monovinylaromatic compound was modified with rubber to increase the ESCR and wherein the amount of rubber dissolved in the monomer prior to polymerization was chosen so that the content of the soft component (gel phase) in the impact resistant polymer was at least 28% by weight and preferably 38% by weight or more, based on the weight of the impact resistant polymer. The upper limit of the content of soft component was about 50 to 60% by weight and a preferable range of 30 to 40% by weight was found advantageous.

A third method used conventionally to increase ESCR in HIPS is that disclosed in British patent specification 1,362,399 in which a liquid hydrocarbon telomer having an unsaturated carbon chain is added to the HIPS material in amounts ranging from 0.2 up to 5 parts per hundred. Telomers are defined in Websters unabridged dictionary as the products of chemical reaction involving the addition of fragments of one molecule (such as alcohol, acetal or chloroform) to the ends of a polymerizing olefin chain. In the British patent, the telomers utilized exhibited number average molecular weights in the range of 1000 to 6000. Experiments attempting to utilize low molecular weight polybutadienes to manufacture ESCR-HIPS have been unsuccessful because of cross-linking, indicating that this patented process utilizes butadienes which are compounded or blended with polystyrene rather than being added during the polymerization reaction.

Another attempt to improve stress crack resistance of HIPS material can be found in British patent No. GB 2,153,370A, wherein a HIPS material was manufactured utilizing a high molecular weight rubber material having a stated molecular mass of at least 300,000, a viscosity greater than or equal to 140 centipoise; the resulting HIPS containing between 7 and 10% by weight of rubber, and the polymerization being carried out in the presence of alpha-methyl styrene dimer or a compound chosen from n-dodecylmercaptan, tertiarydodecylmercaptan, diphenyl 1,3 butadiene, or various other compounds of mixtures thereof. Also, this process was carried out in the presence of cyclohexane and ethylbenzene equal to at least 7% by weight of the total ingredients. In addition, additives including monotriglycerides of stearates and polyethylene waxes were also necessary.

On the other hand, additives are used for reasons besides ESCR improvements. U.S. Pat. No. 3,506,740 to Dempsey, et al. teaches the use of low molecular weight polyolefins as internal lubricants for impact polystyrene compositions. Listed examples include polypropylenes and polybutylenes with molecular weights in the range of 800 to 1600 (as measured by vapor pressure osmometry).

It has also been discovered that the final properties of polymeric materials such as their molecular weight, can be affected by the amounts and types of polymerization initiators used. For example, U.S. Pat. No. 5,266,603 discloses the manufacture of expandable polystyrene in bead form having low benzene residual content using perketal and/or monoperoxycarbonate initiators.

U.S. Pat. No. 4,861,827 to Sosa, et al. discloses a styrene polymerization process for making high impact polystyrene utilizing a free radical initiator which decomposes during the polymerization process to form only non-acid decomposition by-products which can be left in the recycle stream and will not inhibit further polymerization. Examples of such free radical initiators include azo and peroxy compounds.

U.S. Pat. No. 5,559,162 teaches methods of making polymeric peroxycarbonates and processes for using the same as initiators. U.S. Pat. No. 4,433,099 teaches the use of organic peroxide initiators to manufacture impact-resistant styrene polymers with $M_v$ molecular weights in the range of 150,000-170,000. U.S. Pat. No. 4,129,703 discloses the use of a peroxycarbonate initiator for making polystyrene in two thermally distinct polymerization stages, each between about 70° C. and 150° C., with a different initiator for each stage.

SUMMARY OF THE INVENTION

The present invention overcomes the disadvantages of the known high impact polystyrene materials by providing a polystyrene material (PS) containing a polybutadiene or styrene-butadiene rubber, which PS material has been polymerized with said rubber using a particular combination of polymerization initiator materials that provide improved ESCR properties over conventional PS initiators. The high impact polystyrene (HIPS) disclosed by the present invention demonstrates a high resistance to environmental stress cracking, high impact strength, good tensile strength and good flexural strength.

DESCRIPTION OF THE PREFERRED EMBODIMENTS

The present invention discloses a thermoplastic composition containing a polymer of a monovinylaromatic compound which has been modified with an elastomer to increase its impact strength and environmental stress crack resistance, which compound is obtained by polymerizing the monovinylaromatic material in the presence of a combination of polymerization initiators and the elastomer. In the composition, the portion of the soft component in the polymer, which has been modified to increase its impact strength, is less than 28% by weight based on the polymer, the soft component being defined as the toluene-insoluble constituent of the polymer which has been modified to increase its impact strength, minus any pigment which may be present. The particular rubber utilized in the present invention could be one of several types, for example the type sold by Firestone and designated as Diene 55 having a Mooney viscosity of approximately 55, a number molecular weight of about 150,000, weight average molecular weight of about 300,000, and a Z molecular weight of about 500,000 as measured by the gel permeation technique. Another type of advantageous rubber material includes the high-C is rubbers.

The high impact polymers may be manufactured in accordance with any conventional process, provided the constituents mentioned hereinabove are utilized. Normal manufacturing processes include mass polymerization and solution polymerization such as that disclosed in U.S. Pat. No. 2,694,692 or mass suspension polymerization such as that disclosed in U.S. Pat. No. 2,862,906. Other processes of manufacture may also be used, provided the processes are capable of utilizing the constituents mentioned hereinabove.

Suitable monovinylaromatic compounds utilizing the present invention include styrene as well as styrenes alkylated in the nucleus or side-chain as alphamethyl styrene and vinyltoluene. The monovinylaromatic compounds may be employed singly or as mixtures. In one preferred embodiment, styrene was the monovinylaromatic compound of preference. The high impact polystyrene (HIPS) manufactured according to the present invention is formed by polymerizing the monovinylaromatic compound in the presence of the rubber and a novel combination of initiators which include a combination of perketals and peroxycarbonates. The level of rubber utilized is preferably in the range of about 5-15% by weight of the solution. The polymerization is carried out in a conventional manner by mass polymerization, solution polymerization, or polymerization in aqueous dispersion, the rubber first being dissolved in the polymerizable monomer and this solution then being subjected to polymerization in the presence of the initiator combination. A suitable peroxycarbonate polymerization initiator would include for example, t-Amyl 2-Ethylhexyl peroxycarbonate (TAEC) and a suitable perketal initiator would be ethyl-3,3-di (t-butyl peroxy)-butyrate, such as that sold by Elf Atochem North America, 2000 Market St., Philadelphia, Pa. and designated commercially as LUPERSOL 233. When using solution polymerization, the starting solution may be mixed with up to about ten percent (10%) by weight, based on the monovinylaromatic compound employed, of an inert diluent. Preferred inert diluents include aromatic hydrocarbons or mixtures of aromatic hydrocarbons such as toluene, ethylbenzene, xylenes, or mixtures of these compounds. Suitable chain transfer agents, e.g., mercaptans or alphamethyl styrene dimer, may also be added to control polymer molecular weight and rubber particle size. Additionally, lubricants, such as mineral oil and polyisobutylene, may also be added.

The present invention may also be utilized in a continuous flow process for producing polystyrene utilizing a pre-inversion reactor in which a solution of styrene, rubber, and the initiator combination, is polymerized to a point below the inversion point and then introduced into a second stirred tank reactor. The viscosity of the solutions in the pre-inversion and in the second stirred tank reactor are closely controlled to produce desirable HIPS. The particular process for manufacturing the preferred embodiment may be found in U.S. Pat. No. 4,777,210 to Sosa et al., dated Oct. 11, 1988, the entire disclosure of which is hereby incorporated herein by reference.

The ESCR-enhancing initiator combination of perketals and peroxycarbonates is preferably added to the initial monomer/rubber feed stream, or may be added at any point in the polymerization process, up to and including the final polymerization reactor. One particular initiator which was found to provide unexpected increases in ESCR properties comprised the aforementioned t-Amyl 2-Ethylhexyl peroxycarbonate (TAEC) which was utilized in combination with the perketal initiator LUPERSOL 233. The TAEC was utilized in varying proportions, with a preferable level of approximately 150 to 800 PPM by weight. The LUPERSOL 233 was added in amounts ranging around 200 PPM.

In a first embodiment of the invention, a mixture of conventional butadiene rubber having a molecular weight corresponding to a Mooney viscosity of approximately 55, and styrene monomer was polymerized into a high impact polystyrene material by the above-mentioned patented process utilizing varying levels of TAEC and perkatal initiator.

The following Table I illustrates the improvements in ESCR obtainable by using the initiator combination of this invention, compared to conventional processes:

TABLE I

ESCR Improvement

|  | A | B | C | D |
|---|---|---|---|---|
| PPM Initiator #1 | 400 | 400 |  |  |
| PPM Initiator #2 |  |  | 400 | 400 |
| PPM Initiator #3 | 200 | 200 | 200 | 200 |
| PPM Chain Transfer Agent | 500 | 500 | 500 | 500 |
| Mineral Oil % | 2 | 2 | 2 | 2 |
| PIB % | 2 | 2 | 2 | 2 |
| Span Measure of R.P. Size Distribution | 1.8 | 1.6 | 1.0 | 1.4 |
| R.P.S. (microns) | 6.1 | 5.8 | 4.2 | 5.0 |
| % Rubber | 11.4 | 12.0 | 11.5 | 11.5 |
| Swell Index | 12.2 | 12.1 | 12.8 | 13.0 |
| Gels % | 23.3 | 24.8 | 24.5 | 22.8 |
| Grafting | 104 | 107 | 113 | 99 |
| % Toughness Retained ESCR | 22.5 | 22.8 | 36.8 | 44.3 |
| Tensile Modulus | 228,300 | 214,300 | 210,900 | 221,900 |

*Initiator #1 is Lupersol L-531 a perketal
*Initiator #2 is TAEC
*Initiator #3 is Lupersol L233 a perketal For reference purposes, HIPS materials for use in food containers containing fats or oils would be successful according to the following ESCR levels:

| ESCR | Result |
|---|---|
| 10% | Premature stress cracks |
| 20% | Marginal success |
| 30% | Good resistance |
| 40% | Excellent resistance |

In another set of examples, the present invention was utilized to maximize material ductility (increase gel level) in a HIPS material for cup manufacture. Table II below shows two examples of a cup-grade HIPS material utilizing lower levels of rubber content than a food container material. One example utilizes conventional cup grade HIPS material and the other utilizes that of the present invention:

TABLE II

|  | A | B |
|---|---|---|
| PPM Initiator L-331 | 400 |  |
| PPM Initiator TAEC |  | 600 |
| PPM Initiator L-233 | 200 | 200 |
| PPM Chain transfer agent | 200 | — |
| % m.o. | 2 | 2 |
| % PIB | — | — |
| Span RPS Distributors | 2.0 | 1.5 |
| Micron RPS | 3.3 | 3.6 |
| % Rubber | 4.2 | 4.4 |
| Swell Index | 10.7 | 10.8 |
| Gels | 9.7 | 12.5 |
| Grafting | 130 | 184 |
| Tensile Mod. | 339,500 | 332,300 |

CONCLUSIONS

From Table I it appears clear that the combination of perketal and peroxycarbonate initiators of examples C and D resulted in significant improvements in ESCR values (36.8 and 44.3) compared to conventional materials A and B (with ESCR levels of 22.5 and 22.8).

Table II shows that not only ESCR improvement can be obtained using the present invention. In a non-food-grade HIPS material (i.e. cupgrade) where ESCR is not critical, the present invention realized improvement in the gel content (12.5 versus 9.7) and grafting level (184 vs. 130). Example B represents the use of the present invention and Example A represents a conventional process.

Thus it can be clearly demonstrated from the results shown above that the combination of perketal initiator with peroxycarbonate initiator achieves HIPS materials with improved ESCR as well as improvements in other areas, such as gel content and grafting levels.

What is claimed is:

1. A method for preparing a monovinylaromatic polymer material, comprising:
    introducing a monovinylaromatic monomer feed stream into a polymerization reactor,
    introducing an elastomer feed stream into said polymerization reactor;
    introducing a polymerization initiator compound into said reactor, said initiator compound comprising at least one perketal and at least one peroxycarbonate in an amount of from about 150 ppm to about 800 ppm by weight; and
    reacting said monomer, said initiator compound, and elastomer to form an elastomer-modified monovinylaromatic polymer having an elastomeric component of less than 28% by weight of polymer and an ESCR level producing good or excellent resistance to oils.

2. The method of claim 1 wherein said perketal comprises ethyl-3,3-di (t-butyl peroxy)-butyrate and said peroxycarbonate comprises t-Amyl 2-Ethylhexyl peroxycarbonate.

3. The method of claim 2 wherein said peroxycarbonate is added in amounts of from about 400 PPM to about 800 PPM by weight.

4. The method of claim 3 further comprising adding to said reactor at least one chain transfer agent and at least one lubricant, said lubricant being selected from the group consisting of mineral oil and polyisobutylene.

5. The method of claim 4, wherein said chain transfer agent is a mercaptan.

6. The method of claim 4 wherein said lubricants added are mineral oil and polyisobutylene.

7. An elastomer-modified monovinylaromatic polymer prepared in accordance with the method of claim 1.

8. The process of claim 1, wherein the monovinylaromatic monomer is styrene.

9. A process for producing high impact polystyrene comprising:

introducing a styrene monomer feed stream into a polymerization reactor;

introducing an elastomer feedstream in an amount of from 5 to 15% by weight into said reactor along with said styrene monomer feed;

introducing an initiator compound into said reactor, said compound comprising at least one perketal initiator and at least one peroxy-carbonate initiator in an amount of from 150 ppm to about 800 ppm by weight; and reacting said feedstreams and initiator compound to produce impact resistant polystyrene having an ESCR level producing good or excellent resistance to oils.

10. The process of claim 9 wherein said perketal is ethyl-3,3-di (t-butyl peroxy)-butyrate, and said peroxycarbonate is TAEC.

11. A high impact polystyrene prepared in accordance with the method of claim 9.

* * * * *